March 28, 1939.　　　　　H. P. ELLIOTT　　　　　2,152,180
AUTOMATIC STENCIL MOISTENER
Filed Nov. 9, 1937　　　　2 Sheets-Sheet 1
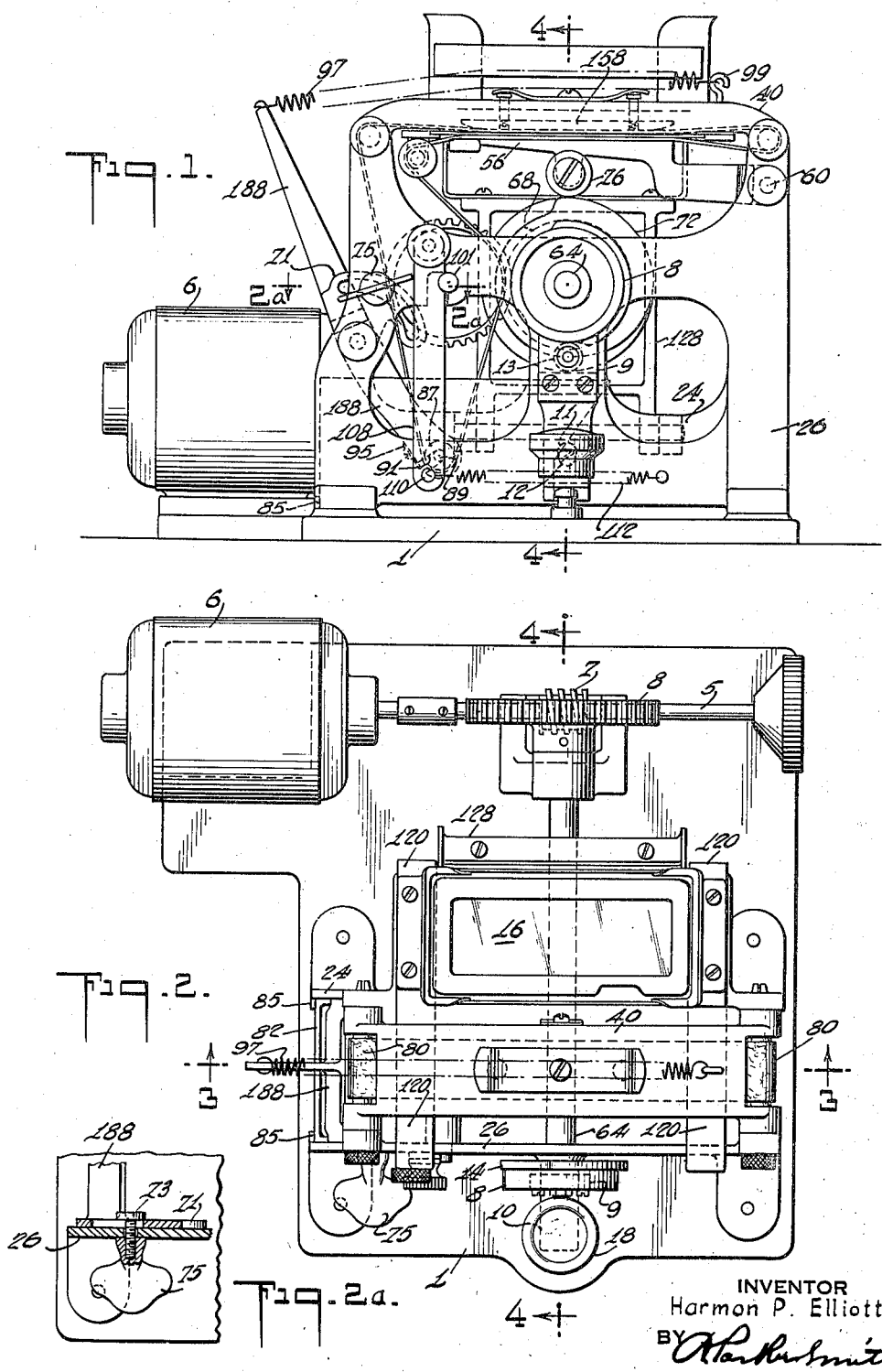
INVENTOR
Harmon P. Elliott.
BY
ATTORNEY March 28, 1939. H. P. ELLIOTT 2,152,180
AUTOMATIC STENCIL MOISTENER
Filed Nov. 9, 1937 2 Sheets-Sheet 2
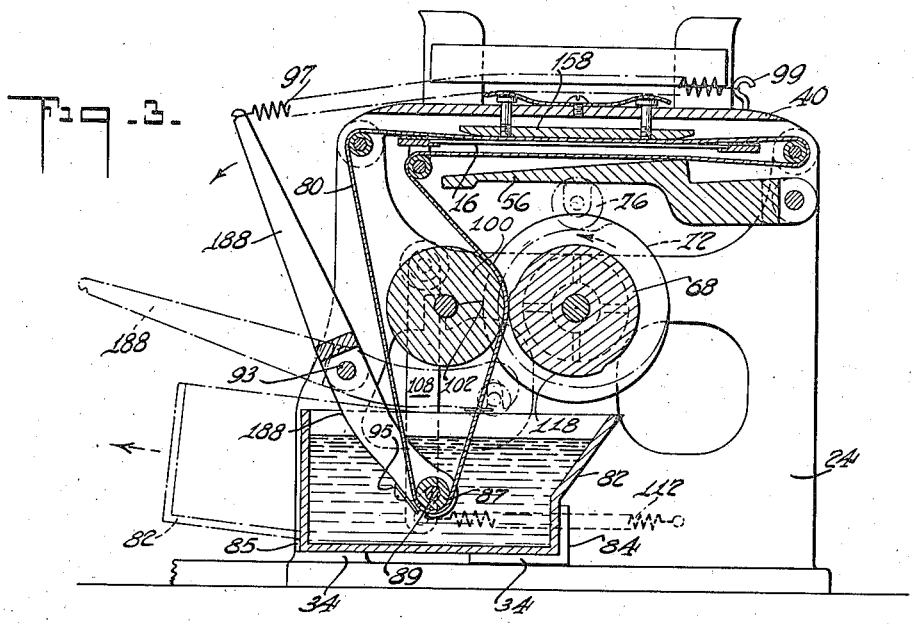
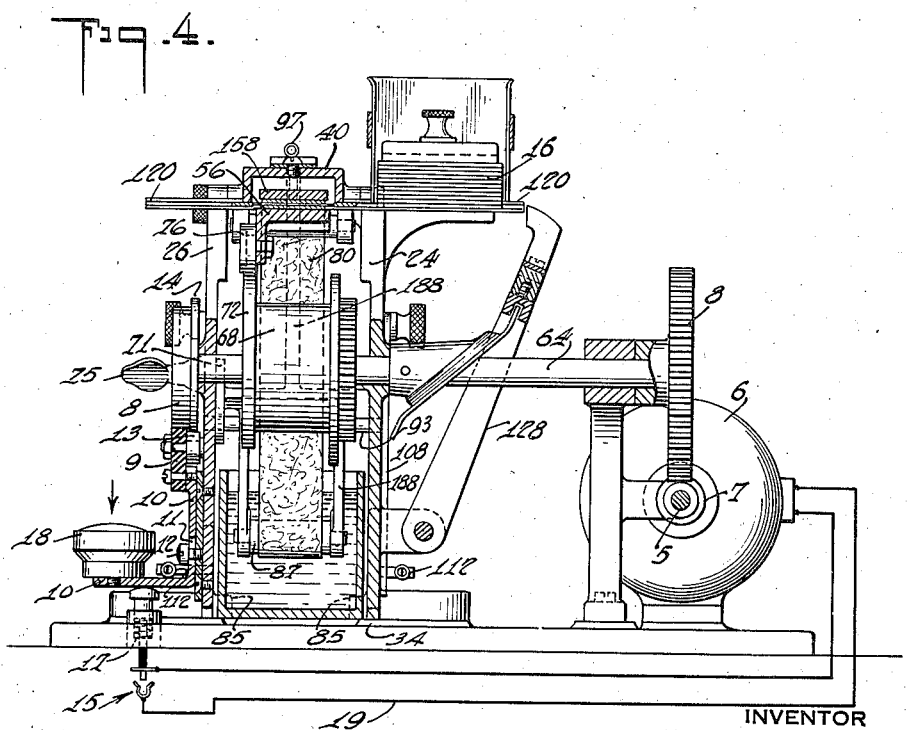
INVENTOR
Harmon P. Elliott.
BY
ATTORNEY Patented Mar. 28, 1939

2,152,180

UNITED STATES PATENT OFFICE 2,152,180

AUTOMATIC STENCIL MOISTENER

Harmon P. Elliott, Watertown, Mass., assignor to The Elliott Addressing Machine Company, a corporation of Massachusetts Application November 9, 1937, Serial No. 173,645

2 Claims. (Cl. 91—54)

This invention relates to apparatus for moistening card stencil blanks such as are used to make stencils to be run through addressing machines, and for similar purposes, in which the panel to be indented to form the stencil is composed of yoshino paper with a coating which can be so indented when damp by the blow of the type of a typewriting machine and thereby expose the loose fibre of the yoshino fabric which is permeable to ink while the undisturbed portions of the coating are not. The present invention embodies certain improvements on the machine shown in my prior Patent No. 2,049,537 granted August 4, 1936, but in large part employs a substantial reproduction of the basic apparatus described in said prior patent.

The main objects of the present improvement are to render the patented apparatus (which is hand operated) automatic, i. e. have it power driven, preferably by a small electric motor, and to render the mechanism for producing the tension on the belt of moist absorbent material used in the apparatus foolproof and susceptible of a standardized adjustment which will not be disarranged every time the water tank in which a portion of said belt runs is taken out of the machine for refilling or cleaning. The herein described apparatus is automatic in the sense that the operator is merely required to use one hand in momentarily closing an electric switch in order to set it in operation for the moistening of one stencil blank, and can then go on with her work of cutting on her typewriting machine the previously moistened one she takes from the machine before or after initiating a new cycle of operations by closing said switch.

The best form of apparatus at present known to me embodying my present invention is illustrated in the accompanying two sheets of drawings in which Fig. 1 is a front elevation of the machine, the parts being shown in a position of rest, Fig. 2 is a plan, and Fig. 2a is a detail fragmentary section on the line 2a—2a of Fig. 1, showing the clamp for holding the belt tightener in adjusted position.

Fig. 3 is a vertical section on line 3—3 of Fig. 2, the parts being shown in positions assumed while the apparatus is in operation.

Fig. 4 is a vertical cross section on lines 4—4 of Figs. 1 and 2.

Throughout the drawings like reference characters indicate like parts, all the parts which are shown in substantially the same form in my said prior Patent No. 2,049,537 being given (when referred to herein) the same reference numerals as appear in such patent.

1 is the base plate supporting the vertical side plates 24, 26, in which latter is journaled the horizontally extending main shaft 64, carrying the belt feeding drum 68 and the cam 72 which cooperates with cam roller 76 journaled on the under side of swinging platen 56 which oscillates about the shaft 60 set in said side plates, all as in the previously patented apparatus, but said main shaft 64 is, according to my present invention, driven by a little electric motor 6, by means of worm gearing 5, 7, 8, instead of by the hand crank shown in the patent.

The supply circuit 19 for the motor is controlled by any convenient form of switch or circuit controller such as indicated generally at 15 in Fig. 4, which is normally held open by compression spring 17. To stop the rotation of the motor and movement of the apparatus parts substantially within predetermined periods after circuit 19 has been opened a brake drum 8 is made fast on the outer end of shaft 64 and arranged to cooperate with the brake shoe 9 carried by the slotted angle-slide 10 which has a slight vertical movement limited by the pin 12 mounted on the frame plate 26 and passing through slot 11 in said angle-plate. 13 is a cam roller carried on the upper end of the angle-slide and cooperating with cam 14 which is made integral with drum 8. The lower, horizontally extending portion of the angle-slide 10 rests on the push button of switch 15 and carries the larger push button 18 which is conveniently arranged for the application of downward pressure by the operator in the direction indicated by the arrow in Fig. 4. The high portion of brake cam 14 extends through about 180° and is substantially in registry with the platen operating cam 72, as shown in Fig. 1. The parts above described constitute the attachment for rendering the apparatus automatic in its action whenever the operator presses down on button 18.

The drum 68 has a raised section 118 of its periphery, as shown here and in the patent, which cooperates with the yieldingly journaled drum 100 to intermittently seize any section of the belt 80 located between them and advance said belt through the water tank 82, under the anvil 158 and over platen 56 so as to remove from between the latter the belt section compressed against either side of a stencil blank 16 during the last preceding operation. The drum 100 is carried on shaft 102, which is loosely held between semicircular notches 101 in frame plates 24, 26, and in levers 108 pivoted at 110 and biased to swing toward said shaft by springs 112. These parts are so proportioned that only the high portion 118 of drum 68 will press belt 80 against yielding drum 100 sufficiently to give motion to such belt once in each machine cycle.

The operation of the above described apparatus is as follows: When at rest the parts are in the position shown in Figs. 1, 2 and 4 with the brake on, switch 15 open, platen 56 raised, the panel of a stencil blank 16 clamped between two strands of the moist belt 80, and the pusher frame 128 withdrawn.

Necessarily this is the position of rest because from the locations of cams 72 and 14, shown in Figs. 1 and 2 when the machine is geared to give them counterclockwise rotation, the platen 56 has just previously been raised to clamp belt 80, since its roller 76 has run up on the advancing end of cam 72, and cam roller 13 has just previously run off the opposite end of cam 14, thus permitting brake shoe 9 to rise and be pressed against brake drum 8, thereby stopping all movement as soon as the momentum of the moving parts has been overcome by the friction of the brake shoe on the drum.

When the operator next presses down on button 18, the brake will come off, switch 15 be closed and the motor 6 started. Thereupon further rotation of cam 72 in a counterclockwise direction when looking at Fig. 1 through nearly 180° will leave belt 80 undisturbed and its moistening action on the stencil blank continuing, while the brake is still on and panel frame 128 is being retracted into the position shown in Fig. 4, thereby allowing the stencil blank at the bottom of the stack in the magazine to drop into guides 120, 120, ready to be pushed out of the magazine and in between the belt strands after platen 56 has been lowered so that it no longer clamps the stencil blank theretofore held between the moist belt strands, the moistened blank then being pushed out by the entering dry one and projecting from the ends of guides 120, 120, ready to be grasped by the operator for cutting it on a typewriting machine to form a stencil.

After about half a revolution of each of the cams has been completed cam 72 will pass out from under roller 76, platen 56 will drop, so as to release the belt sections between it and anvil 158 and the stencil blank which has been moistened will be released as above described. At or about the same time the belt feeding drum section 118 will press the belt section between it and drum 110 against the latter and so give the belt a movement sufficient to bring other moistened sections between anvil and platen. During this period the pusher 128 moves in (to the left looking at Fig. 4) to push the dry stencil blank at the bottom of the stack in magazine 2 in between such belt strands, at the same time forcing out the previously moistened blank therein as above described.

After this cycle of operations has been started by pressing down button 18 the cam 14 comes over the roller 13 so that when said button is thereafter freed from manual pressure the brake is still held off and switch 15 still held closed with the result that motor rotation continues until nearly a complete revolution has occurred. Just before that cam 14 will have passed beyond roller 13 and the brake will be set, but the inertia of the spinning armature of the motor will cause it to continue for a very short period to idle and so move the parts to the position of the beginning of another cycle before they come to rest. During this period and for some time thereafter the drums 68 and 100 will exert no feeding action on belt 80 which has been independently brought to a stop by platen 56 rising and clamping its strands and the dry stencil between them against anvil 158, all the parts ultimately coming to rest in the position shown in Fig. 1.

The timing of cams 14 and 72 should be adjusted for any particular machine according to the period required for the brake to overcome the mechanism and stop its spinning after switch 15 has been opened. In the drawings very little such clearance is indicated, but in some cases about a quarter revolution elapses after the brake is applied before the parts come to rest.

In the case illustrated the operator must hold button 18 down for nearly half a revolution before cam 14 comes into position to continue holding it down and the brake off, while in cases where the momentum of the moving parts may have caused the cam 14 to continue revolving through an arc of perhaps 90 degrees or more after the circuit has been operated, and the brake has been applied, button 18 would not need to be manually held down for any such long period of time.

In all cases the cam 72 and full faced drum sector 118 must be so adjusted circumferentially of the shaft 64 that the feeding action of the drums on belt 80 will have terminated before platen 56 is raised to clamp said belt against the stencil blank for the moistening operation.

To secure the best results the arcuate lengths of both cams 72 and 14 should be about 180°, as shown. Also, of course, the raised part 118 of the surface of the drum 68 should bear on belt 80 only during the interval while the roller 76 is not running on the high portion of cam 72 and while brake roller 13 is bearing on cam 14, since each period of belt movement must occur while the brake is released and the belt is not being clamped between anvil 158 and platen 56.

In my Patent No. 2,049,537 the rotation of drum 68 and cam 72 are indicated as being clockwise because said patent shows a hand-operated machine and the natural tendency of an operator is to turn a crank in the clockwise direction. Obviously the mechanism will operate when the parts revolve in either direction, if properly adjusted, and as any motor actuated driving device operates equally well in either direction and I have found that a counterclockwise rotation for drum 68 is preferable, the apparatus here shown is so designed.

The advantages of the counterclockwise movement of the cams and drum 68 herein shown is that the driving tension is then applied to the belt 80 at a point quite close to that where the parallel sections thereof must be held apart and free from wrinkling to permit the stencil blanks to be pushed in between them. Any slack in the belt due to stretching &c. is below the drum 100. On the other hand, if the belt feed were in the reverse direction such slack condition would arise above drum 100 and the lower strand of the belt passing over platen 56 would very likely be loose enough to permit it to wrinkle up and catch the advancing edge of the incoming stencil blank.

Another improvement resulting from the direction of belt drive here shown results from the fact that the freshly moistened belt section coming out of the water tank goes to the compression zone directly without having any of the water squeezed out of it by the driving drums, as was the case in the arrangement shown in my said prior patent. Also this freshly moistened section is pressed against the top of the stencil blank so that all moisture squeezed out of it has a full opportunity to soak into the panel of the blank, whereas in the other arrangement, where the under belt section was the wetter one, the action of gravity tended to deposit the moisture squeezed out of it on platen 56 instead of on the stencil blank.

The belt tightener herein shown differs from that shown in my Patent No. 2,049,537 in the following respects: Instead of the single arm 88 with a semi-cylindrical section 86 around which the belt passes, as best shown in Fig. 11 of said patent, I have here shown a bifurcated frame 188 having the take-up roller 87 on shaft 89 which is revoluble in the downwardly opening slots 91 cut in the extremities of the forked lower portion of said frame 188, the shaft being releasably held in such position by the spring clips 95. The said frame is pivoted between the side plates 24, 26, on the shaft 93 and over its upper extremity is hooked one end of a tension spring 97, the other end of which is anchored by the hook 99 set in the anvil holding plate 40. Rigidly mounted on frame 188 is the slotted quadrant 71 having the screw 73 passing through it and threaded into the wing nut 75, as best shown in Fig. 2a, the head on the inner end of screw 73 being of large enough diameter to prevent its being pulled through the slot in the quadrant 71.

The operation of this improved form of belt tightener is as follows: Spring 97 is made of a carefully graduated length and strength in the shop so that when the parts are in position and before clamping screw 73 is tightened up by co-operation of the wing nut 75 just the right degree of tension will be given to the belt. Then whenever the machine is to be put in operation the thumb nut is set up, permanently holding the parts in this pre-adjusted position and thereby preventing the frame 188 being oscillated by the intermittent pulls on the belt 80 produced by rotation of the drums 68, 100.

But whenever an operator slacks off the thumb nut 75 to permit the tightener frame 188 to be swung down into the broken line position shown in Fig. 3 so as to withdraw the water tank 82 (as indicated by the arrow and broken line position of said tank in said Fig. 3) for purpose of refilling or cleaning, the frame 188 will return to proper position when released after the tank has been replaced, and can then be again clamped in that position which will produce the predetermined proper tension on the belt. In this way the necessity for the operator re-adjusting the tightener frame shown in Fig. 11 of my patent after any disturbance of its original shop-adjusted position, is avoided.

The water tank is supported on the edges of the bosses 34, 34, on the base plate 1, as shown in Fig. 4, and is held in proper position by the back stop 84 shown in Fig. 3 and the low front stops 85, best shown in Fig. 2 but also indicated in Figs. 1 and 4.

The advantages of the described construction over that shown in my Patent No. 2,049,537 comprise the once-for-all tension adjustment which will persist through any number of tank removing operations, the reduced friction on the belt resulting from the employment of the roller 87 and the facility in tipping the tightener frame 188 for purposes of tank removal or reinsertion resulting from the long upwardly extending shank of the frame 188.

Various changes could be made in the details of the construction of the parts shown without departing from the underlying principle of my invention so long as the relative arrangement of equivalent parts capable of producing the mode of operation and result described is retained and the resulting structure is within some or all of the appended claims.

Having described my invention, I claim:

1. In an apparatus for moistening stencil blanks, comprising an endless belt and means for guiding it through a blank-moistening zone, the combination of a movable water tank, a frame pivoted to swing in a substantially vertical plane with its lower end carrying belt tightening means and immersed in said tank when both are in normal positions, a spring having a strength graduated to produce a predetermined tension in said belt operatively connected to said frame, and manually operable releasable means for clamping said frame in the position assumed whenever such spring-produced tension has been applied to said belt; whereby when said clamping means has been released to permit a swinging of said frame so as to allow removal of said tank, the belt tightening mechanism will return automatically to normal position when released ready to be again clamped in such position.

2. In an apparatus for moistening stencil blanks comprising a pair of oppositely disposed revoluble drums between which said belt extends and one of which is provided with means for grasping and driving it during a portion of each revolution only, a reciprocating device adapted to compress a portion of said belt at a point some distance away from that where it is grasped by said drum and a cam rigidly connected with said driving drum for actuating said belt compressing device between belt driving operations, the combination, with said above recited apparatus, of an electric motor geared to said driving drum, a manually operable circuit controller for said motor biased toward circuit opening position, a friction brake for preventing rotation of said drum and motor biased toward operative position, and manually operable means for simultaneously closing said circuit controller and releasing said brake, together with a second cam revoluble synchronously with said driving drum adapted to hold said circuit closed and said brake released after said drum has begun to revolve and during its belt driving action.

HARMON P. ELLIOTT.